United States Patent [19]

Walker

[11] 3,888,638
[45] June 10, 1975

[54] INSULATING WEDGE INSERTION
[75] Inventor: Robert G. Walker, Ossian, Ind.
[73] Assignee: Industra Products, Inc., Fort Wayne, Ind.
[22] Filed: Feb. 28, 1974
[21] Appl. No.: 446,721

[52] U.S. Cl. .............................................. 29/205 E
[51] Int. Cl. .......................................... H02k 15/10
[58] Field of Search .............. 29/205 E, 205 D, 596; 310/214

[56] References Cited
UNITED STATES PATENTS

| | | | |
|---|---|---|---|
| 2,432,267 | 12/1947 | Adamson | 29/596 |
| 3,324,536 | 6/1967 | Hill | 29/205 D |
| 3,519,862 | 7/1970 | Walker | 310/214 |
| 3,694,887 | 10/1972 | Walker et al. | 29/205 E |

Primary Examiner—Thomas H. Eager
Attorney, Agent, or Firm—Albert L. Jeffers; Roger M. Rickert

[57] ABSTRACT

In a device for placing insulating wedges and coils into selected slots of a dynamoelectric machine magnetic core by linearly moving wedge push rods into a wedge containing magazine to force wedges axially from the magazine into the core slots an improvement for inserting wedges of varying lengths is disclosed comprising a variable length coupling between a reciprocable carriage and the insulating wedge push rods for varying the penetration of the push rods and therefore also the final position of the corresponding insulating wedges according to the length of the particular wedge being inserted.

11 Claims, 6 Drawing Figures

INSULATING WEDGE INSERTION

BACKGROUND OF THE INVENTION

The present invention relates to apparatus for placing insulating wedges into selected slots of a magnetic core and more particularly to such apparatus wherein insulating wedges are forced axially from a wedge containing magazine into core slots by linearly moving wedge push rods into the magazine. Even more particularly, the present invention relates to apparatus of the foregoing type which is easily adaptable to inserting wedges of varying lengths.

It is known to provide a dynamoelectric machine stator core with stator windings by either winding wire directly in the stator core slots or by winding wire on coil forms and subsequently inserting the prewound coils into the stator core slots. The insertion of prewound coils has met with considerable commercial acceptance and is well illustrated by U.S. Pat. Nos. 2,432,267 to Adamson and 3,324,536 to Hill. In such prewound coil inserting systems, it is also common to insert contemporaneously with the prewound coils, insulating wedges; for example, of the type illustrated in U.S. Pat. Nos. 3,519,862 to Walker and 3,694,887 to Walker and Hill. Briefly, these insulating wedges are employed to further insulate different windings within the stator core; for example, to provide a further insulation between main or running windings and phase or starting windings in a single phase motor or between layers or phases of a poly-phase motor. Such insulating wedges are also inserted into stator slots after the last winding to prevent individual wires from slipping out of the individual stator slots and to further insulate the windings from the remainder of the machine. As pointed out more completely in the aforementioned Walker and Hill patent, the phase insulating wedges are generally longer than the bore insulating wedges. Both bore wedges and phase insulating wedges may be inserted by coil inserting apparatus of the type illustrated in the aforementioned Hill patent, however, insulating wedges of mixed lengths are not normally inserted during the same cycle of the machine and the machine is normally arranged to make a longer stroke of all of the wedge push rods when inserting the shorter bore wedges.

This variation in insertion stroke for separate cycles of the machine is generally adequate when fabricating relatively simple motors, however, for motors of more sophisticated or special purpose design, it would be highly advantageous to be able to vary the length of stroke for individual or groups of wedge push rods, thereby allowing the insertion of different length wedges during one cycle of the machine.

It is accordingly one object of the present invention to provide a coil inserting device of the type illustrated in the aforementioned Hill, 3,324,536 patent having greater versatility than heretofore.

Another object of the present invention is to provide a device for placing wedges of varying lengths into selected slots of a magnetic core.

A further object of the present invention is to provide a variable length coupling in a device for placing insulating wedges into selected slots of a magnetic core having at least three selectable positions, one for inserting all longer wedges, a second for inserting all shorter wedges, and a third for inserting a mix of longer and shorter wedges.

SUMMARY OF THE INVENTION

The foregoing as well as numerous other objects, features and advantages of the present invention are achieved by providing a mechanism for accommodating a coil inserting device to insert various length wedges having a carriage reciprocably movable in the direction of wedge insertion and means coupling that carriage to wedge push rods including means for varying the distance between the carriage and certain of the push rods to thereby vary the distance that the certain push rods force corresponding wedges to allow the simultaneous insertion of various length wedges. The means for varying may extend the separation between the carriage and those wedge push rods associated with shorter wedges by one half the distance in length between the longer and shorter wedges so that both longer and shorter wedges are inserted symmetrically within the stator slots. In a preferred form, the coupling between the carriage and wedge push rods may comprise first and second plates in a stacked relationship each supporting a plurality of wedge push rods and a third plate having a plurality of upstanding portions for selectively supporting the first and second plates with means for relocating that third plate relative to the first and second plates to select both the plates to be supported and the height at which the selected plates are supported. These variations in support height provide the versatility for the insertion of various length wedges during one cycle of the machine.

The subject matter which I regard as my invention is particularly pointed out and distinctly claimed in the concluding portion of this specification. My invention itself, however, together with further objects and advantages thereof may best be understood by reference to the following description taken in conjunction with the accompanying drawing.

DESCRIPTION OF THE PREFERRED EMBODIMENT

Figure 1:
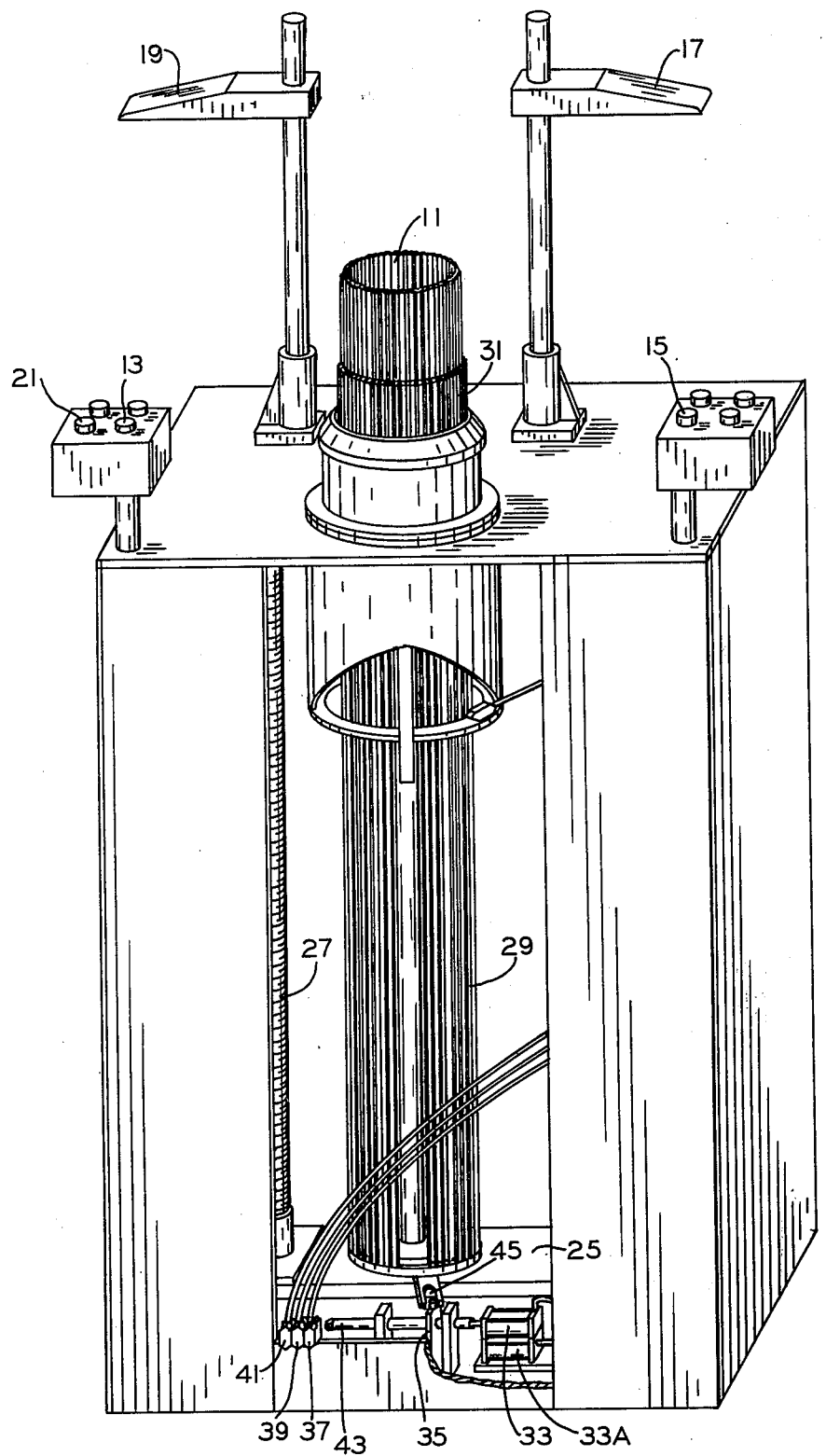
FIG. 1 illustrates in perspective view a coil placing machine embodying the present invention.

Referring now to the drawing in greater detail, FIG. 1 illustrates a coil placing or inserting machine constructed generally in accordance with the teachings of the aforementioned Hill, 3,324,536 patent to which reference may be had for details of construction not mentioned herein. Briefly, the coil placing machine comprises a plurality of upstanding fingers 11 over which prewound coils and a stator core may be placed and the pair of control buttons 13 and 15 depressed to cause the stator clamps 17 and 19 to first rotate about their respective axles and then move down to clamp the stator firmly in place on the fingers 11. In the manual mode of operation, control button 21 may then be depressed to raise the carriage and insert coils and insulating wedges. In the automatic mode of operation, this sequence occurs automatically after the clamps 17 and 19 are in their clamping position. Upon actuation of the machine the carriage 25 begins the upward portion of its reciprocable movement for example, due to the revolving of screws such as 27. The carriage 25 forces the wedge push rods 29 upwardly and these push rods enter a cylindrical wedge magazine such as disclosed in the aforementioned Walker and Hill patent 3,694,887. The wedge push rods force individual wedges out of the magazine and upwardly between adjacent wedge guides 31 and into the stator slots. When the carriage 25 reaches the top of its stroke the drive screws sch as 27 reverse their direction of rotation moving the carriage 25 back downwardly and withdrawing the wedge push rods from the wedge cylinder. The carriage 25 also forces a stripper up through the interior portion of the fingers 11 to force coils from those fingers into the stator slots during the same cycle of operation as the insertion of the insulating wedges.

Variation in the penetration of the entire set of wedge push rods 29 and therefore in the positioning of the insulating wedges in a stator may, of course, be achieved by varying the stroke of the carriage, however, to vary the penetration of only certain ones of the wedge push rods 29, the present invention provides for the varying of the distance between the carriage 25 and certain of those wedge push rods. An air cylinder 33 may be actuated to move the upstanding pin 35 to a second of three linear positions and the particular position of that upstanding pin 35 will move from the position sensed by switch 37 to the position sensed by switch 39 of the position sensing switches. Extending cylinder 33A will move the attached cylinder 33, rod, and upstanding pin 35 sufficiently to engage switch 41. The upstanding pin 35 engages an elongated slot 45 so that linear motion supplied by the air cylinder 33 will impart a rotary motion to the plate 47 about a pivot 49. In the preferred embodiment depicted, this plate 47 has three selectable angular positions, one for inserting short wedges, one for inserting long wedges, and one for simultaneously inserting a mix of long and short wedges.

Figure 2:
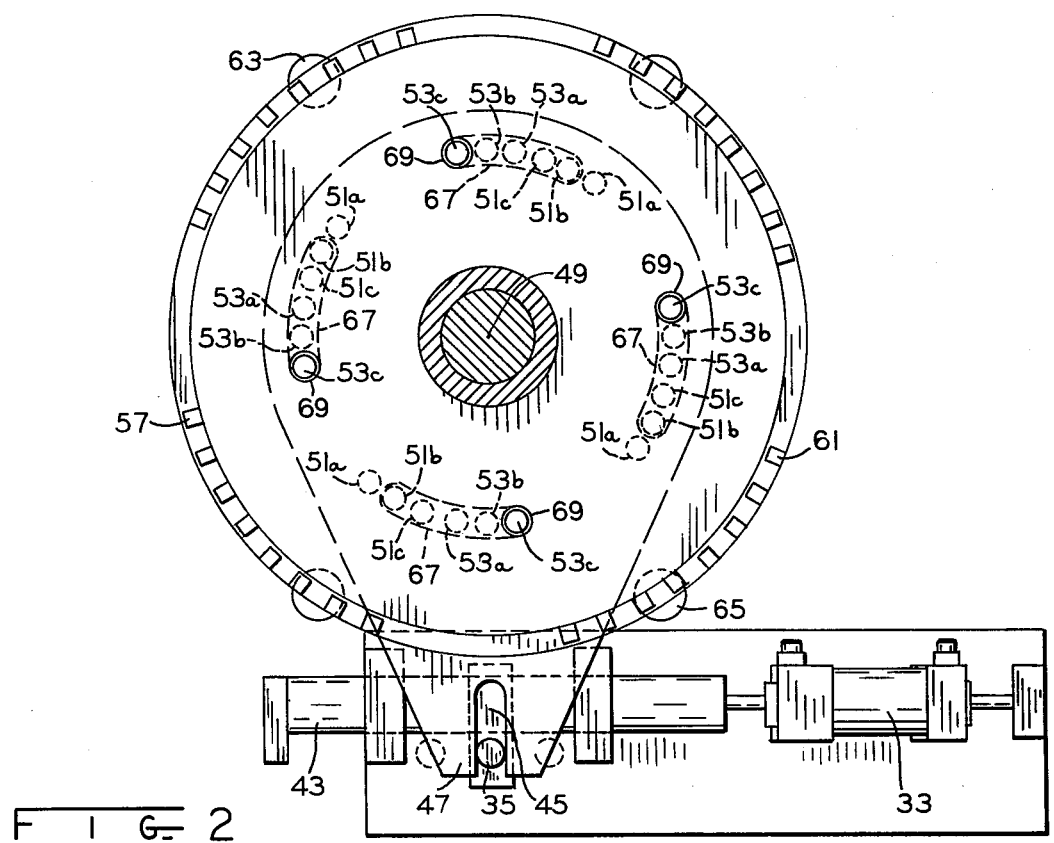
FIG. 2 is a top view of the wedge push rod support structure and variable length coupling means of the present invention.
Figure 3:
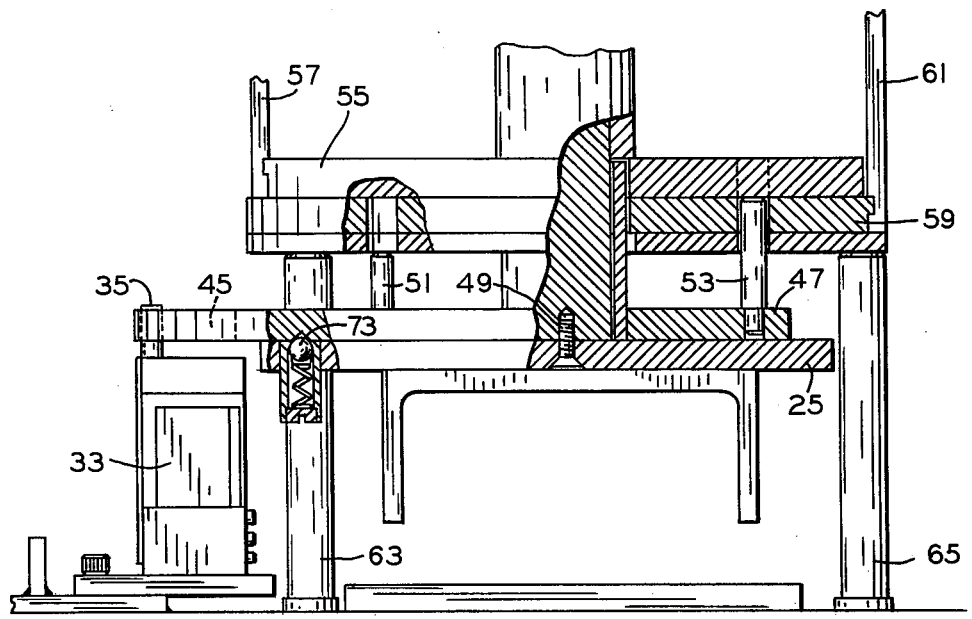
FIG. 3 is a side view partially broken away of the structure of FIG. 2.

Considering now primarily FIG. 3, in conjunction with the other figures, the plate 47 is pivotably attached to the carriage 25 at 49, for example, by the illustrated machine screw and this plate 47 has a plurality of upstanding portions such as pins 51 and 53. A first plate 55 supports at least an exemplary wedge push rod 57 while a second plate 59 supports at least an exemplary wedge push rod 61. As depicted in FIG. 3, the carriage 25 is at the lowermost extreme of its reciprocable movement with the upstanding pin 35 engaging the elongated slot 45 and with the first plate 55 in stacked relationship with and directly supported by the second plate 59 which in turn is supported by a plurality of posts such as 63 and 65. If at this time the air cylinders 33 and 33a are energized to extend the rod 43 to its fullest extension, plate 47 will be revolved in a clockwise direction as viewed in FIG. 2 with the four longer pins corresponding to pin 53 of FIG. 3 assuming the position illustrated by reference numeral 53a in FIG. 2. The four pins corresponding to the short pin 51 of FIG. 3 will similarly assume the position 51a. The lower or second plate 59 has four elongated slots 67, however, in the extreme clockwise position of plate 47 the pin 51 is not aligned with the elongated slot 67 and accordingly plate 59 will be supported on the four pins 51.

Similarly, the upper or first plate 55 has four simple pin accepting holes 69 but since again the pins 53 are not aligned with the holes 69, plate 55 will be supported on the four pins 53. In the particular embodiment illustrated this position corresponds to the situation where the plate 55 is supported on plate 59. With plate 47 in its extreme clockwise position and each of the first and second plates being supported by their corresonding set of pins the carriage 25 engages the wedge push rod supporting plates in the manner illustrated in FIG. 4c and it will be noted that both exemplary wedge push rods 57 and 61 in their upward travel are somewhat above a reference level 71 and the insertion of short wedges will be accomplished.

Figure 4A:
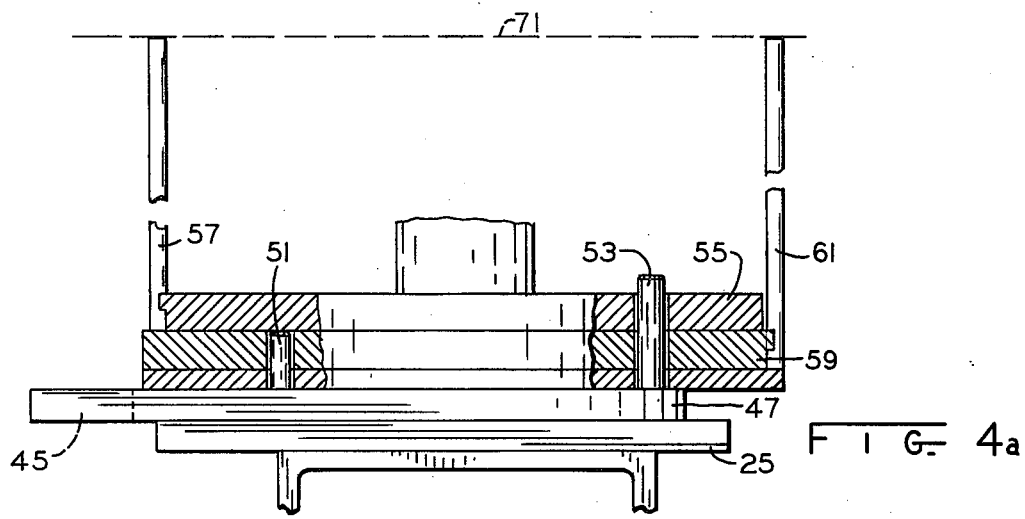
FIGS. 4a, 4b, and 4c are simplified side views similar to FIG. 3 illustrating possible push rod coupling capabilities of the structure of FIG. 3.
Figure 4B:
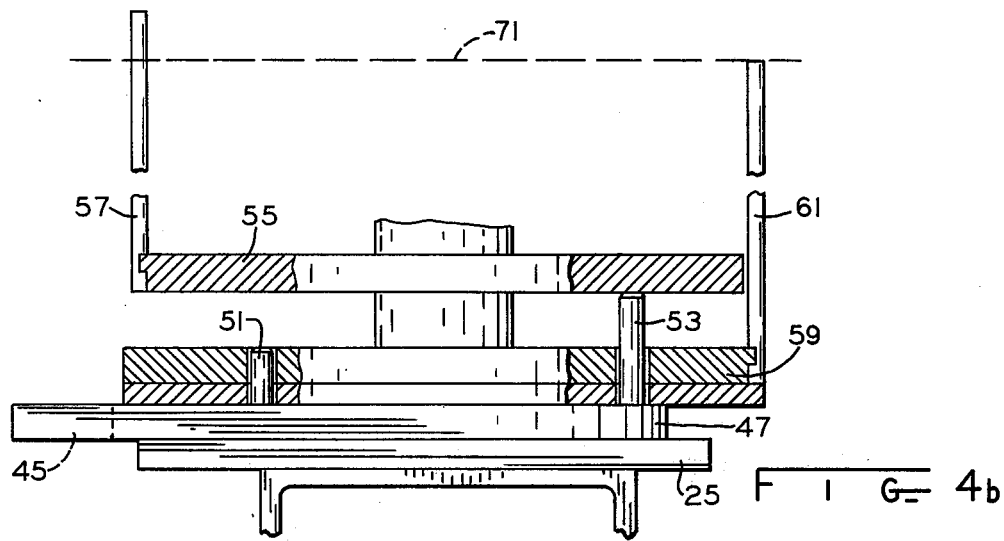
Figure 4C:
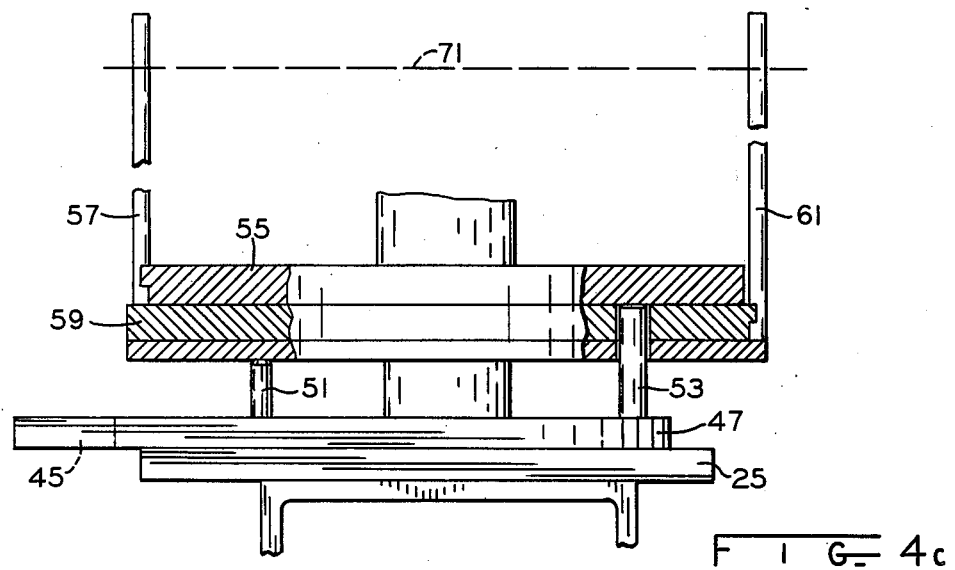

If the plate 47 is revolved counterclockwise to the middle of its three possible angular positions as viewed in FIG. 2, pin 51 assumes the positions illustrated by 51b while the pins 53 take on the position illustrated at 53b. Under these circumstances the pins 53 are not yet lined up with the single hole in plate 55, however, the pins 51 are aligned with the slot 67 in plate 59. Under these circumstances as viewed in FIG. 4b, the carriage 25 will begin its upward movement with pin 51 passing into the slot 67 so that plate 59 is supported directly on the surface of the plate 47 while, however, pin 53 carries the plate 55 somewhat higher and wedge push rod 57 forces its corresponding wedges into the stator a greater distance than does wedge push rod 61. Thus, FIG. 4b illustrates the middle position for plate 47 corresponding to the insertion of a mix of long and short wedges. The separation between plates 55 and 59 is preferable one half the difference in length of the two wedges so that all wedges are placed evenly within the stator core.

Upward movement of the carriage 25, of course, disengages the upstanding pin 35 from the elongated slot 45 and to insure that these two will re-engage when the carriage returns to the bottom of its stroke a detent spring-loaded ball 73 is provided and the upstanding member 35 is not moved unless the carriage 25 is at the bottom of its stroke thus insuring that the slot 45 remains aligned with the upstanding member 35 during the coil insertion process. If the plate 47 is now again rotated to its extreme counterclockwise position pins 53 take on position 53c in alignment with the holes 69 in the upper plate 55 and pins 51 take on position 51c in FIG. 2 and still lie within the slots 67. In this situation pins 51 and 53 pass through their respective plates and the carriage 25 moves further before lifting plates 59 and 55 from the supports 63 and 65. For a fixed length of stroke of the carriage 25 the penetration of the wedge push rods 57 and 61 is again the same but is less than the penetration afforded by the configuration of FIG. 4C thus allowing for the insertion of all long insulating wedges.

Thus, while the present invention has been described with respect to a specific preferred embodiment, numerous modifications will suggest themselves to those of ordinary skill in the art. The exemplary embodiment has been concerned with only long and short wedges, however, one skilled in the art could easily extend the teachings herein to accommodate wedges of several different lengths and multiple patterns. The variable length coupling means between the carriage and the wedge push rods might take on many different configurations other than the simple pins and plates disclosed. The selection of a particular variable length coupling configuration may be under operator control or may be programmed for an automatic sequence of operation. These and other modifications will readily suggest themselves to those of ordinary skill in the art and accordingly the scope of the present invention is to be measured only by that of the appended claims.

I claim:

1. In a device for placing insulating wedges into slots of a magnetic core by linearly moving wedge push rods into a wedge containing magazine to force wedges axially from the magazine into core slots, a mechanism for accommodating the device to insert various length wedges comprising:

a carriage reciprocably movable in the direction of wedge insertion;

means coupling the carriage to the wedge push rods for moving the wedge push rods including means for varying the distance between the carriage and certain of the wedge push rods to thereby vary the distance that the certain wedge push rods force corresponding wedges.

2. The mechanism of claim 1 wherein wedges of two different lengths are to be inserted during one cycle of the carriage, the means for varying including means for extending the separation between the carriage and those wedge push rods associated with the shorter wedges one half the difference in length between dissimilar wedges more than the separation between the carriage and those wedge push rods associated with the longer wedges.

3. The mechanism of claim 1 wherein the means coupling comprises at least first and second plates in stacked relationship each supporting a plurality of wedge push rods.

4. The mechanism of claim 3 wherein wedges of two different lengths are to be inserted during one cycle of the carriage, the means for varying including means for extending the separation between the carriage and the first plate one half the difference in length between dissimilar wedges more than the separation between the carriage and the second plate whereby wedge push rods associated with the first plate function to insert the shorter wedges while wedge push rods associated with the second plate function to insert the longer wedges.

5. The mechanism of claim 3 wherein the carriage includes a third plate having a plurality of upstanding portions for selectively supporting the first and second plates, the means for varying including means for relocating the third plate relative to the first and second plates to select both the plates to be supported and the height at which the selected plates are supported.

6. The mechanism of claim 5 wherein the means for relocating comprises means for selectively rotating the third plate about a pivot between three specified angular positions in a first of which neither of the first and second plates is supported by upstanding portions, in a second of which only one of the first and second plates is supported by upstanding portions, and in a third of which both the first and second plates are supported by upstanding portions.

7. The mechanism of claim 1 wherein wedges of two different lengths are to be inserted, the means for varying having three selectable positions, one for inserting short wedges, one for inserting long wedges, and one for simultaneously inserting a mix of long and short wedges.

8. In a device for placing insulating wedges into slots of a magnetic core by linearly moving wedge push rods into a wedge containing magazine to force wedges axially from the magazine into core slots an improvement for inserting wedges of varying lengths comprising:

means for reciprocably moving the wedge push rods in the direction of wedge insertion; and variable length coupling means interconnecting the wedge push rods and the means for moving to thereby vary the distance that certain of the wedge push rods force corresponding wedges.

9. The improvement of claim 8 wherein wedges of two different lengths are to be inserted, the variable length coupling means having three selectable positions, one for inserting all longer wedges, a second for inserting all shorter wedges, and a third for inserting a mix of longer and shorter wedges.

10. The improvement of claim 8 wherein the variable length coupling means is changeable in length one half of the difference in length of the different wedges to be inserted.

11. The improvement of claim 8 wherein wedges of two different lengths are to be inserted, the variable length coupling means having multiple selectable positions, one for inserting all longer wedges, a second for inserting all shorter wedges, and at least one for inserting varying patterns of a mix of longer and shorter wedges.

* * * * *